(12) United States Patent
Woods et al.

(10) Patent No.: US 10,337,375 B2
(45) Date of Patent: Jul. 2, 2019

(54) SUCTION TUBE FOR A UREA SENSOR

(71) Applicants: WEMA System AS, Blomsterdalen (NO); MEAS France, Toulouse (FR)

(72) Inventors: Erling Alfred Woods, Hjellestad (NO); Armand Castandet, Pechabou (FR)

(73) Assignees: WEMA System AS, Blomsterdalen (NO); MEAS France, Toulouse (FR)

( * ) Notice: Subject to any disclaimer, the term of this patent is extended or adjusted under 35 U.S.C. 154(b) by 86 days.

(21) Appl. No.: 15/716,829

(22) Filed: Sep. 27, 2017

(65) Prior Publication Data
US 2018/0016957 A1 Jan. 18, 2018

Related U.S. Application Data

(63) Continuation of application No. PCT/EP2016/056397, filed on Mar. 23, 2016.

(30) Foreign Application Priority Data

Mar. 27, 2015 (EP) .................................... 15305456

(51) Int. Cl.
*F01N 3/20* (2006.01)
*F01N 3/28* (2006.01)

(52) U.S. Cl.
CPC ......... *F01N 3/2066* (2013.01); *F01N 3/2892* (2013.01); *F01N 2260/10* (2013.01);
(Continued)

(58) Field of Classification Search
CPC combination set(s) only.
See application file for complete search history.

(56) References Cited

U.S. PATENT DOCUMENTS 7,758,826 B2 * 7/2010 Satou .................... F01N 3/2066
422/106
8,459,013 B2 * 6/2013 Hosaka ................. F01N 3/2066
60/295
(Continued)

FOREIGN PATENT DOCUMENTS

DE 102009002209 A1 10/2010
DE 102013000208 A1 7/2014
(Continued)

OTHER PUBLICATIONS

PCT Notification, The International Search Report and the Written Opinion of the International Searching Authority, dated Jul. 4, 2016, 11 pages.
(Continued)

*Primary Examiner* — Binh Q Tran
(74) *Attorney, Agent, or Firm* — Barley Snyder

(57) ABSTRACT

A suction tube for a urea sensor installed in a urea tank comprises a suction pipe and a cover. The suction pipe has a suction opening and a hole extending through a wall of the suction pipe. The cover is disposed on an outside of the suction pipe and covers the hole. When there is an underpressure in the suction pipe compared to the urea tank, the cover abuts the suction pipe and seals the hole. When there is an overpressure in the suction pipe compared to the urea tank, the cover deforms and allows an excess urea solution to escape through the hole and flow back into the urea tank.

14 Claims, 5 Drawing Sheets

(52) U.S. Cl.
CPC ...... *F01N 2450/18* (2013.01); *F01N 2530/18* (2013.01); *F01N 2530/22* (2013.01); *F01N 2560/06* (2013.01); *F01N 2560/12* (2013.01); *F01N 2560/20* (2013.01); *F01N 2610/02* (2013.01); *F01N 2610/10* (2013.01); *F01N 2610/14* (2013.01); *F01N 2610/1446* (2013.01); *F01N 2610/1473* (2013.01); *F01N 2900/1814* (2013.01); *F01N 2900/1818* (2013.01); *Y02A 50/2325* (2018.01); *Y02T 10/24* (2013.01)

(56) References Cited

U.S. PATENT DOCUMENTS

| | | | | |
|---|---|---|---|---|
| 9,605,574 | B2* | 3/2017 | Nihongi | F01N 3/2066 |
| 9,732,653 | B2* | 8/2017 | Ogawa | F01N 3/208 |
| 9,816,758 | B2* | 11/2017 | Gismervik | F01N 3/2066 |
| 10,082,067 | B2* | 9/2018 | Yang | F01N 11/00 |

FOREIGN PATENT DOCUMENTS

| | | |
|---|---|---|
| JP | 2010216306 A | 9/2010 |
| KR | 1020120119470 A | 10/2012 |
| KR | 101205234 B1 | 11/2012 |
| KR | 10201300005141 A | 1/2013 |
| KR | 101366605 B1 | 3/2014 |
| WO | 2011078692 A1 | 6/2011 |

OTHER PUBLICATIONS

Abstract of DE102013000208, dated Jul. 10, 2014, 2 pages.
Abstract of DE102009002209, dated Oct. 14, 2010, 2 pages.
Abstract of KR101205234, dated Nov. 27, 2012, 1 page.
Abstract of JP2010216306, dated Sep. 30, 2010, 2 pages.

* cited by examiner

SUCTION TUBE FOR A UREA SENSOR

CROSS-REFERENCE TO RELATED APPLICATIONS

This application is a continuation of PCT International Application No. PCT/EP2016/056397, filed on Mar. 23, 2016, which claims priority under 35 U.S.C. § 119 to European Patent Application No. 15305456.4, filed on Mar. 27, 2015.

FIELD OF THE INVENTION

The present invention relates to a suction tube and, more particularly, to a suction tube for a urea sensor installed in a urea tank.

BACKGROUND

Selective Catalytic Reduction (SCR) systems have been employed for purification of harmful NOx components in the exhaust gases of diesel vehicles. The SCR systems use urea solution referred to as Diesel Exhaust Fluid (DEF) for purification of the exhaust gases. The urea solution is stored in a urea tank provided on the vehicles. It is essential to ensure appropriate composition and levels of the urea solution inside the tank to achieve efficient purification of the exhaust gases. Urea sensors are thus employed in the urea tanks for measuring the level and/or concentration and/or temperature of the urea solution in the tank. The urea sensor has a level measurement device, a concentration and/or quality measurement device, a temperature measurement device, a suction tube, and a return tube. The suction tube draws urea solution from the urea tank and provides it for breaking down the NOx in the exhaust gas. The return tube circulates any excess amount of urea solution back into the urea tank.

The urea solution has a freezing point of −11° C. Frozen urea solution can pose problems in efficiently breaking down NOx because high volume expansion of the urea solution due to freezing can result in excessive pressure generated inside the suction tube. In addition, due to these high pressures, there is a possibility of rupture of the suction pipe, of the fittings on the suction pipe, and other elements of the suction pipe. In other cases, this pressure may act downwards, forcing a filter on the urea sensor to move or break apart. Currently, there are no efficient solutions to overcome the problem of over pressure on the suction pipe due to freezing.

Korean Patent No. 101205234 discloses a urea solution tank for a diesel vehicle. To prevent ice from colliding with a sensor module, the lower parts of a heating pipe, suction pipe, level sensor, and quality sensor are inserted into a protector. The urea solution tank comprises a tank housing, a sensor module, and a protector. The sensor module comprises a heating pipe, a suction pipe, a level sensor, and a quality sensor. The heating pipe melts the frozen urea solution in the winter. The suction pipe supplies the urea solution to a urea solution sprayer. The level sensor measures the level of the urea solution by a float. The quality sensor measures the concentration and temperature of the urea solution. The lower parts of the heating pipe, suction pipe, level sensor, and quality sensor are inserted into the protector. The protector prevents ice from colliding with the sensor module. The melted urea solution flows down along an inclined portion, and the urea solution flows to the inlet of the suction pipe.

Korean Patent No. 102013005141 discloses a vertical pipe for electrically melting a frozen urea solution. A flexible heating member is provided to rapidly melt the frozen urea solution by independently controlling temperature by a temperature control unit. The vertical pipe for electrically melting the frozen urea solution comprises flexible heating members, a filler member, a urea solution suction pipe, and a urea solution return pipe. The flexible heating members are arranged in a space between an outer pipe and an inner pipe along the length of the vertical pipe at constant intervals. The flexible heating member is filled with the filler members. The urea solution return pipe is shorter than the urea solution suction pipe. The urea solution return pipe and the urea solution suction pipe are inserted into the inner pipe.

Korean Patent No. 1020120119470 discloses a sensor unit for a urea tank with a return pipe for defrosting frozen water. The unit rapidly defrosts the frozen water without driving an engine by having a heating cable and filler in a space between the inner and outer pipes of a dual pipe unit. The sensor unit for a urea tank with a return pipe for defrosting frozen water comprises a head, a lead pipe, a heating pipe, a urea suction pipe, a urea return pipe, and a float. A plurality of nozzle holes is formed on the outer surface of the return pipe, and discharges the urea to the urea tank. The nozzle holes are connected to an inner fluid path. The float is coupled to the outer diameter of the lead pipe, and slides up and down according to the amount of the urea in the urea tank.

Japanese Patent No. 2010216306 discloses an aqueous urea tank for a vehicle for use in an exhaust emission control device. The aqueous urea tank has a cooling water pipe through which engine cooling water flows. The tank further has an aqueous urea pipe to suck in the aqueous urea and send it to an aqueous urea SCR system. The cooling water pipe is furnished partially with an aqueous urea heating pipe structured so that a flow passage is formed in a large diameter pipe in a space with respect to its inner wall and a small diameter pipe is provided internally, wherein one of the pipes is used as aqueous urea pipe while the other is used as the heating water pipe. A suction hole at the tip of the first pipe is located near the bottom in the tank body so as to suck in the aqueous urea solution. The aqueous urea solution flowing through this pipe is heated by the engine heating water flowing through the other pipe.

PCT Application No. 2011078692 discloses an apparatus for measuring quality of a urea solution which is operated with at least a portion of the apparatus inserted into the urea solution. The apparatus includes a configuration of sensors for measuring mechanical and electrical properties within a volume of the urea solution, the measurements of mechanical and electrical properties being mutually differently influenced by components present in the urea solution. A data processing arrangement of the apparatus processes the measurements of mechanical and electrical properties for generating output data indicative of a quality of the urea solution. The apparatus is also capable of being adapted to measure qualities of other types of solution.

There is a need to improve operation of the suction-return under cold conditions.

SUMMARY

A suction tube for a urea sensor installed in a urea tank according to the invention comprises a suction pipe and a cover. The suction pipe has a suction opening and a hole extending through a wall of the suction pipe. The cover is disposed on an outside of the suction pipe and covers the hole. When there is an under-pressure in the suction pipe compared to the urea tank, the cover abuts the suction pipe and seals the hole. When there is an overpressure in the suction pipe compared to the urea tank, the cover deforms and allows an excess urea solution to escape through the hole and flow back into the urea tank.

BRIEF DESCRIPTION OF THE DRAWINGS

The invention will now be described by way of example with reference to the accompanying figures, of which.

DETAILED DESCRIPTION OF THE EMBODIMENT(S)

Figure 1:
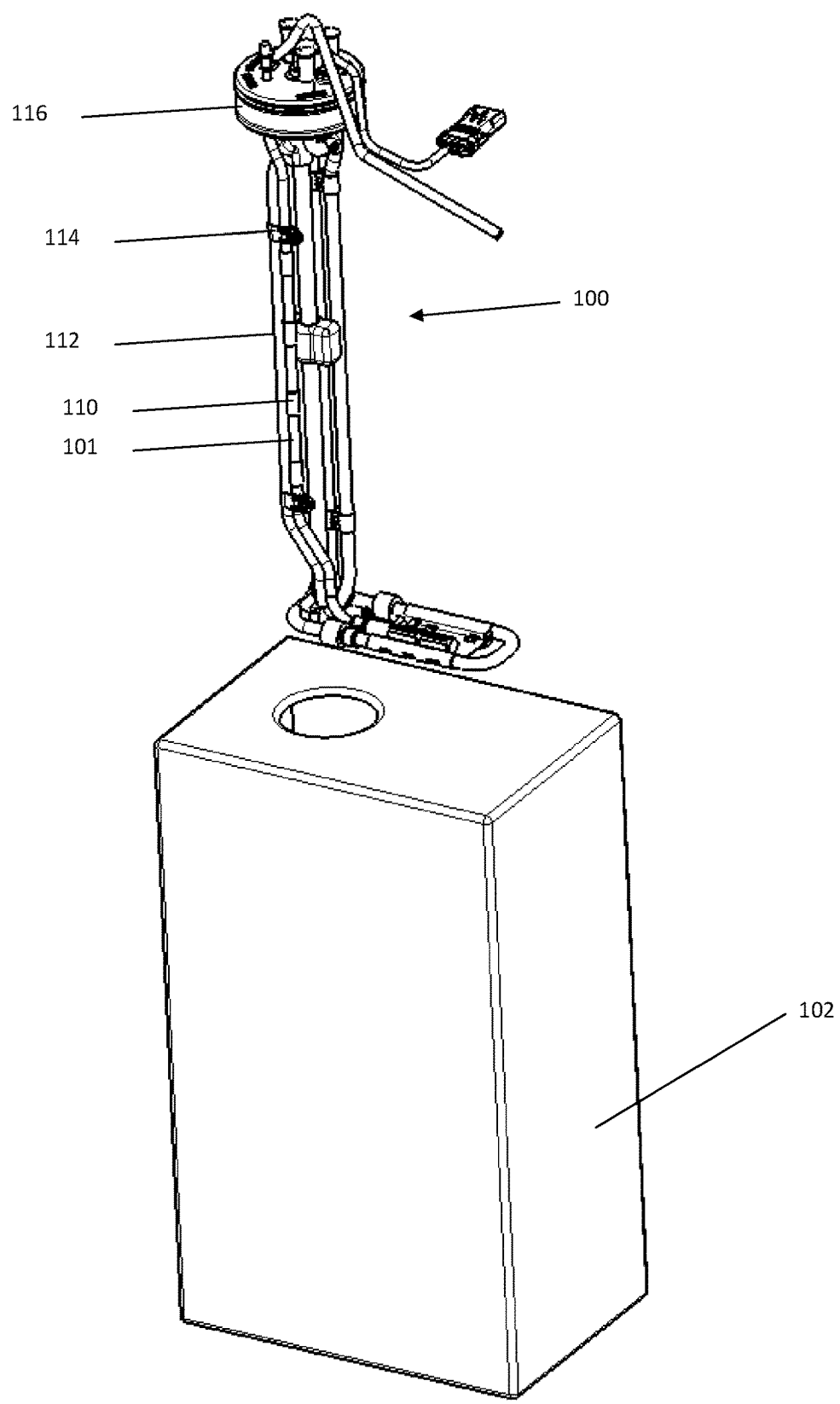
FIG. 1 is an exploded perspective view of a selective catalytic reduction system according to the invention.
Figure 2:
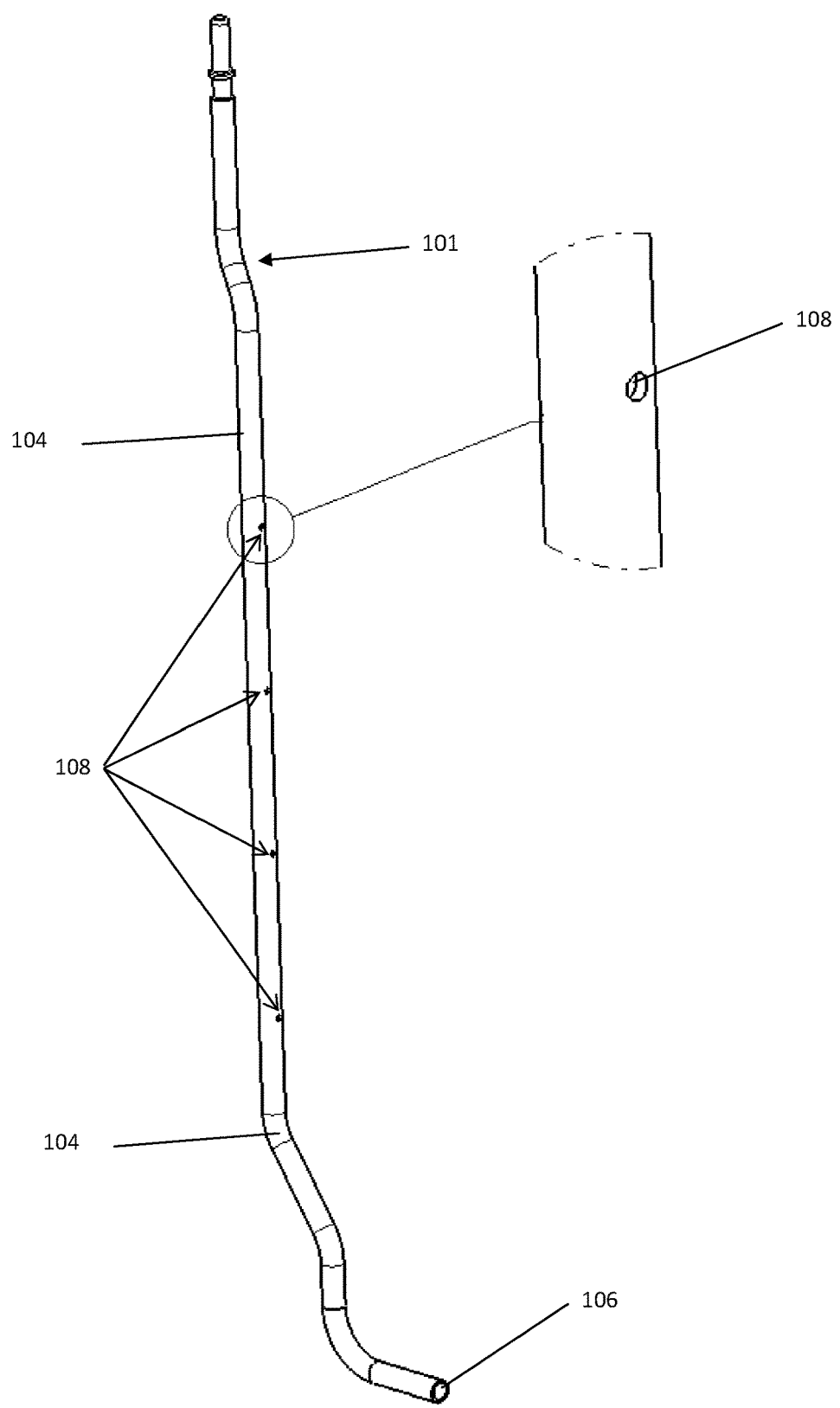
FIG. 2 is a perspective view of a suction tube of the selective catalytic reduction system.
Figure 3:
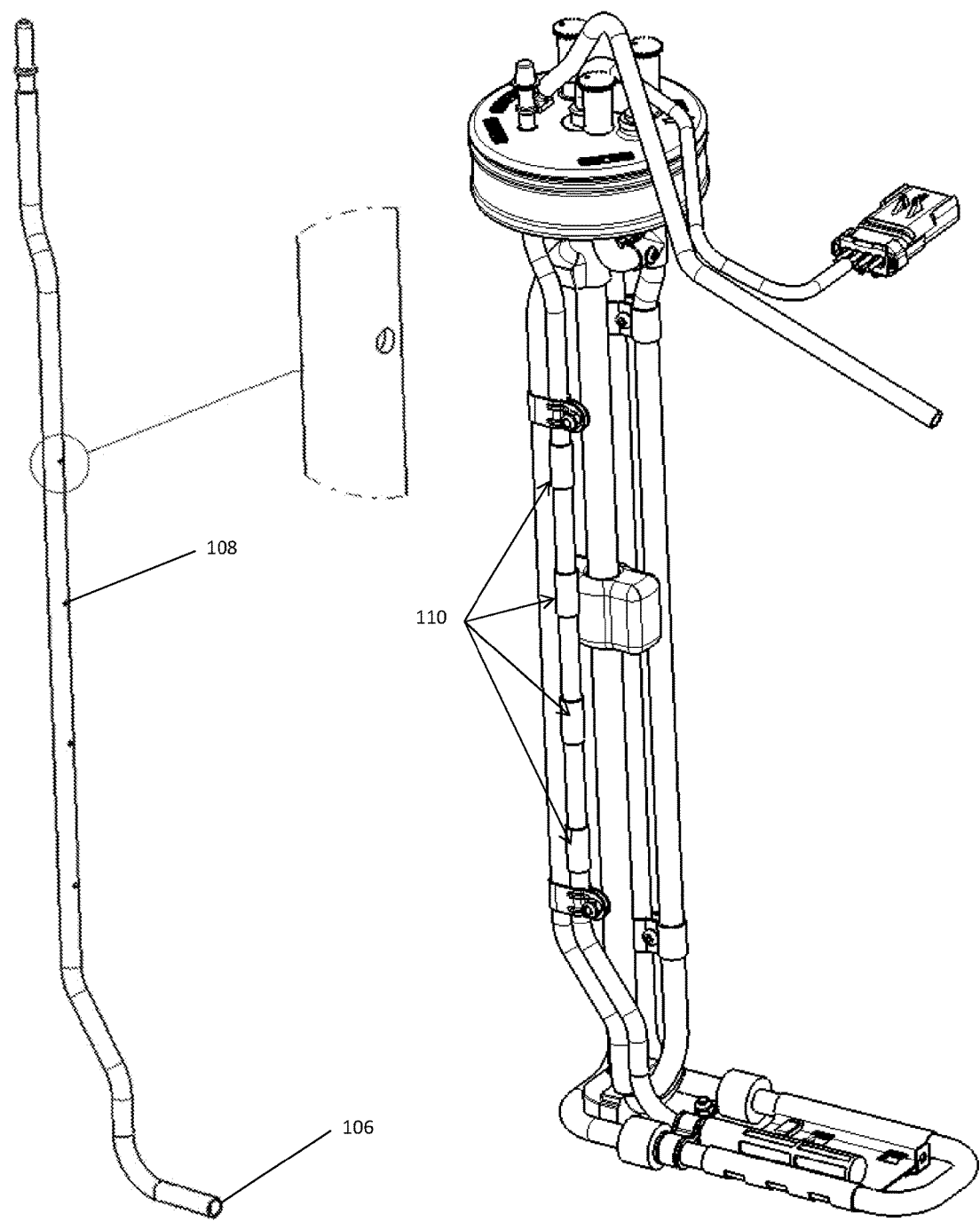
FIG. 3 is a perspective view of an embodiment of a urea sensor of the selective catalytic reduction system.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

A selective catalytic reduction (SCR) system according to the invention is shown in FIG. 1. The SCR system includes a urea sensor 100 and a urea tank 102. In an embodiment, the urea sensor 100 is used to monitor a quality of a urea solution for exhaust treatment systems of a diesel vehicle. The urea sensor 100, as shown in FIG. 1, includes a suction tube 101 insertable into the urea tank 102 and providing a urea solution from the tank 102 to a sensor assembly 116 of the urea sensor 100. The sensor assembly 116 is capable of measuring one or several properties of the urea solution.

The suction tube 101, as shown in FIGS. 2-5, includes a suction opening 106 disposed in the tank 102. In a mounted state, the suction opening 106 is located in a region near the bottom of the tank 102. A suction pipe 104 of the suction tube 101 leads upwards through the tank 102 towards the sensor assembly 116. The suction pipe 104 has a plurality of holes 108 extending through a wall of the suction pipe 104 and allowing fluids, for example, liquids and gasses, to pass through the wall of the suction pipe 104. The holes 108 are distributed along a length of the suction pipe 104 and are all disposed along a same side of the suction pipe 104.

A plurality of covers 110 is provided as shown in FIGS. 1 and 3-5 to seal the holes 108 in a valve-like manner. The covers 110 are formed of a flexible material, such as rubber or plastic, and can expand and contract under the influence of pressure. In the embodiment shown in FIG. 3, each of the holes 108 has a separate cover 110; these covers 110 may be formed by short pieces of a hose, wherein each short piece at least partially surrounds the suction pipe 104, acts like a valve, and allows venting. Instead of covering each hole 108 by means of an individual cover 110, in the embodiment shown in FIG. 4, one or more of the holes 108 can be covered by the shared cover 110, for instance a longer piece of hose. The shared cover 110 may have further holes in it which are placed at a certain distance from the closest hole 108 in the suction pipe 104. In an embodiment, the covers 110 have a bulge corresponding to the hole 108 and penetrating into the hole 108 to secure the cover 110 from moving along the suction pipe 104 from any mechanical force generated by waves in the urea solution, thermal expansion of pipes, or ice forming in the tank 102 and the like.

By providing the suction pipe 104 with at least one hole 108 that is covered on the outside by a cover 110, it can be ensured that when there is an under-pressure in the suction pipe 104 compared to in the urea tank 102, the cover 110 will abut the suction pipe 104 and seal the hole 108. On the other hand, with an overpressure inside the suction pipe 104 compared to the tank 102, the cover 110 deforms to allow excess urea solution to escape through the hole 108 from the suction pipe 104 and flow back in to the tank 102.

Figure 4:
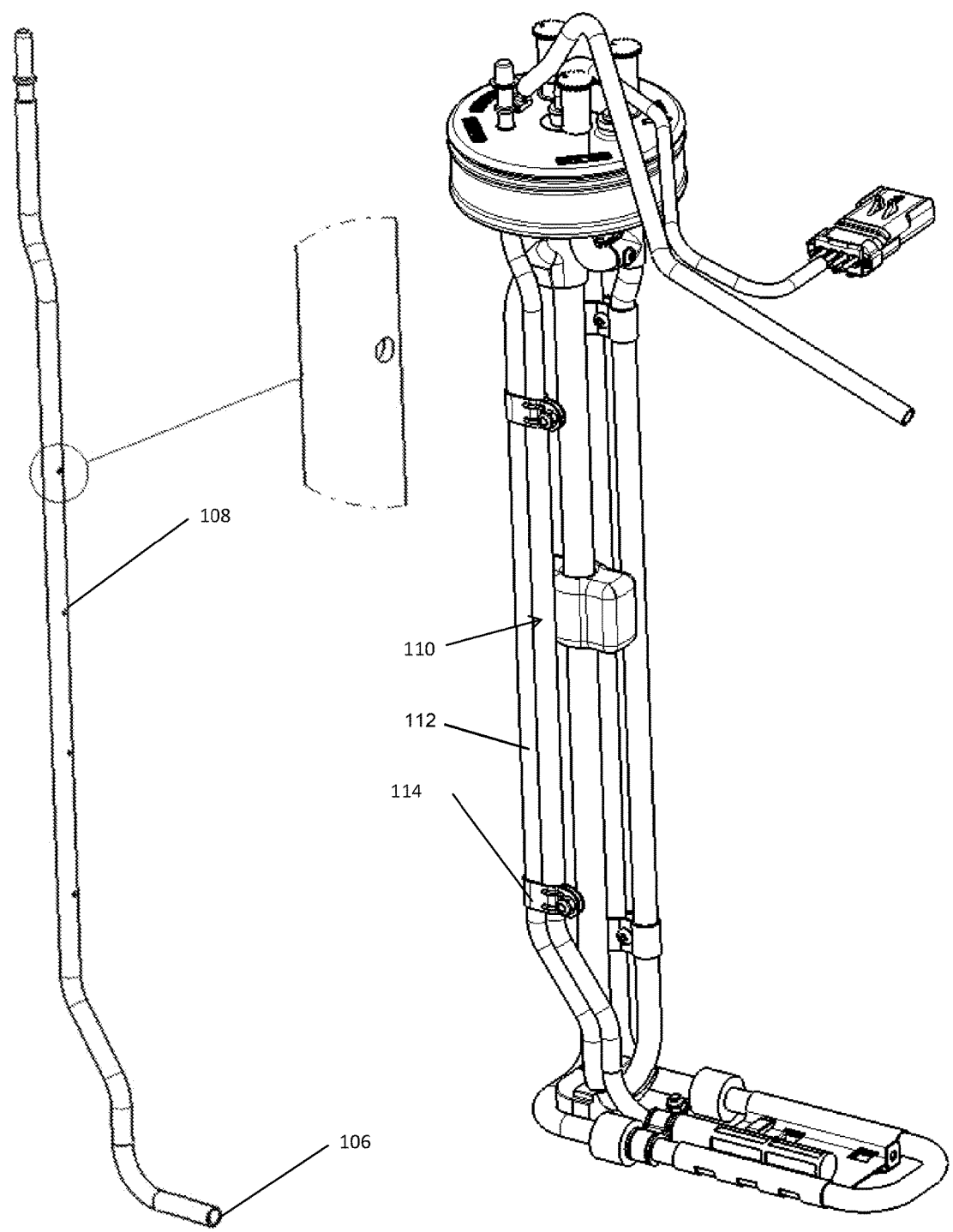
FIG. 4 is a perspective view of another embodiment of a urea sensor of the selective catalytic reduction system.
Figure 5:
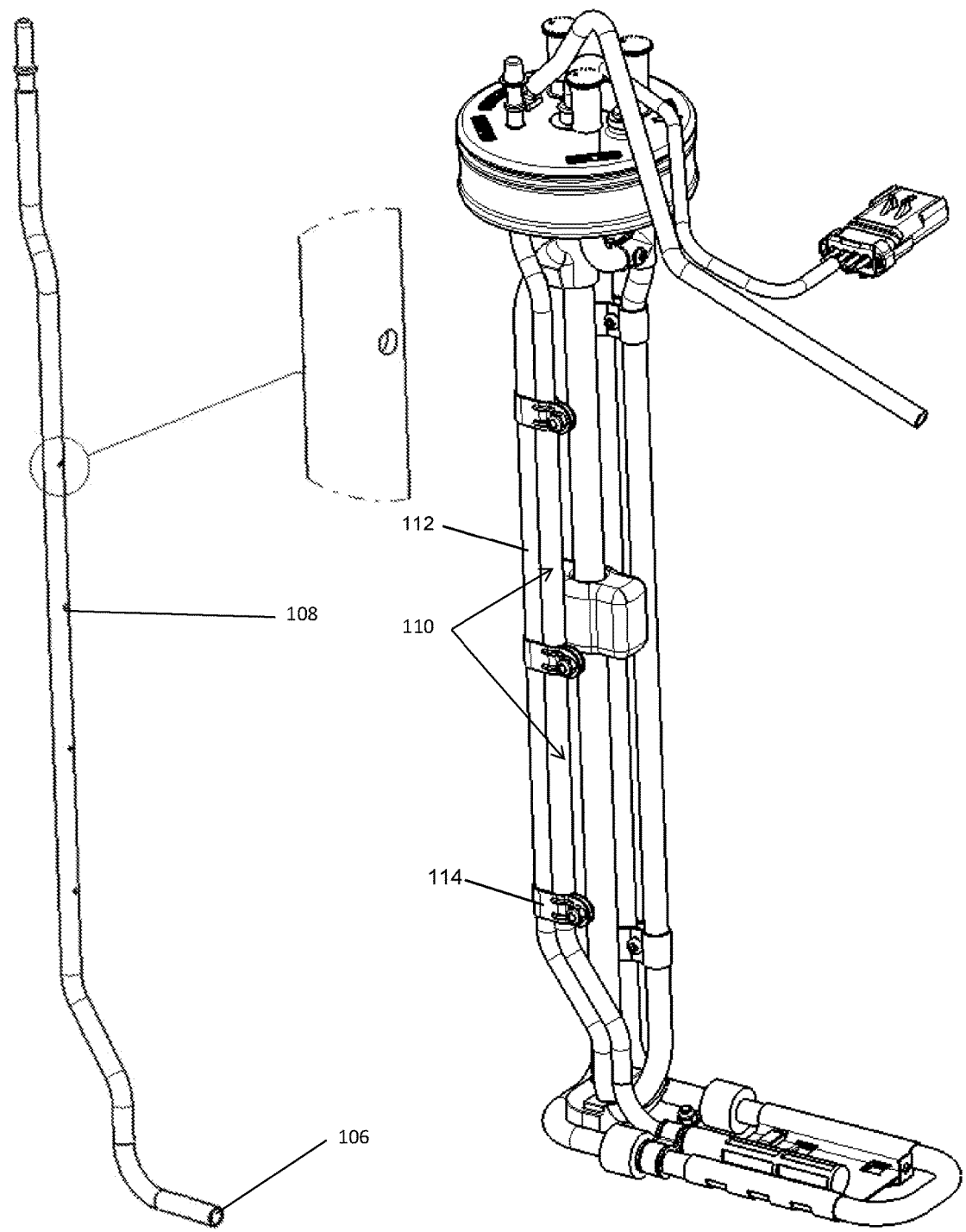
FIG. 5 is a perspective view of another embodiment of a urea sensor of the selective catalytic reduction system.

As shown in FIGS. 1, 4, and 5, for mechanically stabilizing the urea sensor 100, a plurality of clamps 114 fix the suction pipe 104 to a heating pipe 112 running in parallel to the suction pipe 104. These clamps 114 can also fix the cover 110 but are arranged such that the fluid can still escape from the cover 110 into the tank 102. Hot fluid may be circulated inside the heating pipe 112. The clamps 114 may be made from metal or another material that create a thermal connection between the heating pipe 112 and the suction pipe 104 to facilitate heating of the suction tube 101 to thaw any ice that may have formed inside the suction pipe 104.

What is claimed is:

1. A suction tube for a urea sensor installed in a urea tank, comprising:
a suction pipe having a suction opening and a hole extending through a wall of the suction pipe; and
a cover disposed on an outside of the suction pipe and covering the hole, and when there is an under-pressure in the suction pipe compared to the urea tank, the cover abuts the suction pipe and seals the hole, and when there is an overpressure in the suction pipe compared to the urea tank, the cover deforms and allows an excess urea solution to escape through the hole and flow back into the urea tank.

2. The suction tube of claim 1, wherein the cover is formed of a flexible material.

3. The suction tube of claim 2, wherein the cover is formed from rubber or plastic.

4. The suction tube of claim 2, wherein the cover is a piece of a hose and at least partially surrounds the suction pipe.

5. The suction tube of claim 4, wherein the suction pipe has a plurality of holes distributed along a length of the suction pipe.

6. The suction tube of claim 5, wherein each of the holes is covered by a separate piece of the hose.

7. The suction tube of claim 5, wherein the holes are all covered by a same piece of the hose.

8. The suction tube of claim 5, wherein the holes are all disposed on a same side of the suction pipe.

9. The suction tube of claim 4, wherein the piece of the hose has a bulge corresponding to the hole.

10. The suction tube of claim 4, wherein the piece of the hose is fixed with a clamp to the suction pipe.

11. A urea sensor for installation in a urea tank, comprising:
a suction tube used to draw a urea solution from the urea tank, the suction tube including a suction pipe having a suction opening and a hole extending through a wall of the suction pipe and a cover disposed on an outside of the suction pipe and covering the hole, and when there is an under-pressure in the suction pipe compared to the urea tank, the cover abuts the suction pipe and seals the hole, and when there is an overpressure in the suction pipe compared to the urea tank, the cover deforms and allows an excess urea solution to escape through the hole and flow back into the urea tank.

12. The urea sensor of claim 11, further comprising a heating pipe extending parallel to the suction pipe.

13. The urea sensor of claim 12, further comprising a clamp connecting the heating pipe to the suction pipe.

14. A selective catalytic reduction system for purification of harmful NOx components in the exhaust gases of diesel vehicles, comprising:
   a urea tank containing a urea solution; and
   a urea sensor installed in the urea tank and capable of measuring a property of the urea solution, the urea sensor including a suction tube having a suction pipe with a suction opening and a hole extending through a wall of the suction pipe, and a cover disposed on an outside of the suction pipe and covering the hole, and when there is an under-pressure in the suction pipe compared to the urea tank, the cover abuts the suction pipe and seals the hole, and when there is an overpressure in the suction pipe compared to the urea tank, the cover deforms and allows an excess urea solution to escape through the hole and flow back into the urea tank.

\* \* \* \* \*